United States Patent
Vaccaro et al.

(10) Patent No.: US 9,563,590 B2
(45) Date of Patent: Feb. 7, 2017

(54) DEVICES WITH ARBITRATED INTERFACE BUSSES, AND METHODS OF THEIR OPERATION

(71) Applicants: Joseph S. Vaccaro, Chandler, AZ (US); Michael P. Collins, Chandler, AZ (US)

(72) Inventors: Joseph S. Vaccaro, Chandler, AZ (US); Michael P. Collins, Chandler, AZ (US)

(73) Assignee: NXP USA, INC., Austin, TX (US)

( * ) Notice: Subject to any disclaimer, the term of this patent is extended or adjusted under 35 U.S.C. 154(b) by 340 days.

(21) Appl. No.: 14/216,633

(22) Filed: Mar. 17, 2014

(65) Prior Publication Data

US 2015/0261704 A1    Sep. 17, 2015

(51) Int. Cl.
- G06F 13/20 (2006.01)
- G06F 13/364 (2006.01)
- G06F 13/362 (2006.01)

(52) U.S. Cl.
CPC .......... *G06F 13/364* (2013.01); *G06F 13/362* (2013.01)

(58) Field of Classification Search
USPC ......... 710/113–118, 309, 216, 217, 316, 317
See application file for complete search history.

(56) References Cited

U.S. PATENT DOCUMENTS

| | | | | |
|---|---|---|---|---|
| 3,231,868 A | * | 1/1966 | Bloom | G06F 7/02 711/136 |
| 4,096,572 A | * | 6/1978 | Namimoto | G06F 13/18 710/113 |
| 4,214,305 A | * | 7/1980 | Tokita | G06F 7/785 710/113 |
| 4,473,880 A | * | 9/1984 | Budde | G06F 13/374 710/112 |
| 4,672,536 A | * | 6/1987 | Giroir | G06F 13/36 710/241 |
| 4,733,346 A | * | 3/1988 | Tanaka | G06F 9/462 712/228 |
| 4,805,097 A | * | 2/1989 | De Sanna | G06F 12/10 711/206 |
| 4,958,273 A | * | 9/1990 | Anderson | G06F 11/1666 710/113 |
| 5,146,596 A | * | 9/1992 | Whittaker | G06F 13/364 710/116 |
| 5,195,089 A | * | 3/1993 | Sindhu | G06F 12/0831 370/235 |

(Continued)

FOREIGN PATENT DOCUMENTS

| EP | 1433185 B1 | 11/2007 |
|---|---|---|
| EP | 1456720 B1 | 11/2007 |

OTHER PUBLICATIONS

"Arbitration and Switching Between Bus Masters", Lattice Semiconductor Corporation, Feb. 2010, pp. 1-6, Reference Design RD1067.

*Primary Examiner* — Paul R Myers

(57) ABSTRACT

A system having an arbitrated interface bus and a method of operating the same are provided. The system may include, but is not limited to, one or more registers configured to store data, a plurality of external interfaces configured to receive data access requests for the register(s), an arbitrator communicatively coupled to each of the plurality of external interfaces, and an interface bus communicatively coupled between the arbitrator and the register(s), wherein the arbitrator is configured to arbitrate control of the interface bus between the plurality of external interfaces.

17 Claims, 4 Drawing Sheets

(56) References Cited

U.S. PATENT DOCUMENTS

| | | | | |
|---|---|---|---|---|
| 5,265,257 A * | 11/1993 | Simcoe | G06F 13/362 | 710/263 |
| 5,280,608 A * | 1/1994 | Beaverson | G06F 11/24 | 714/34 |
| 5,369,748 A * | 11/1994 | McFarland | G06F 13/4031 | 370/444 |
| 5,418,967 A * | 5/1995 | Simcoe | G06F 13/362 | 710/113 |
| 5,432,911 A * | 7/1995 | Mura | G06F 13/362 | 700/14 |
| 5,481,729 A * | 1/1996 | Shibuya | G06F 13/26 | 710/220 |
| 5,485,586 A * | 1/1996 | Brash | G06F 13/364 | 370/462 |
| 5,604,735 A * | 2/1997 | Levinson | H04L 12/52 | 370/360 |
| 5,664,121 A * | 9/1997 | Cerauskis | G06F 13/362 | 710/113 |
| 5,901,146 A * | 5/1999 | Upp | H04L 12/403 | 370/389 |
| 5,907,689 A * | 5/1999 | Tavallaei | G06F 13/362 | 709/245 |
| 5,931,931 A * | 8/1999 | Nguyen | G06F 13/364 | 710/109 |
| 5,935,234 A * | 8/1999 | Arimilli | G06F 13/364 | 710/113 |
| 6,038,630 A * | 3/2000 | Foster | G06F 13/1684 | 709/231 |
| 6,157,978 A * | 12/2000 | Ng | G06F 13/364 | 710/117 |
| 6,330,245 B1 * | 12/2001 | Brewer | H04L 12/433 | 370/424 |
| 6,523,076 B1 * | 2/2003 | Kruse | G06F 13/36 | 710/113 |
| 6,523,110 B1 * | 2/2003 | Bright | G06F 9/30054 | 712/235 |
| 6,535,941 B1 * | 3/2003 | Kruse | G06F 13/362 | 710/113 |
| 6,681,285 B1 * | 1/2004 | Ng | G06F 13/1605 | 348/718 |
| 6,772,256 B1 * | 8/2004 | Regev | G06F 13/4022 | 709/245 |
| 2002/0042898 A1 * | 4/2002 | Jones, Jr. | G11C 29/48 | 714/744 |
| 2004/0249545 A1 * | 12/2004 | Lu | B60R 21/0132 | 701/70 |
| 2007/0011548 A1 * | 1/2007 | Chemudupati | G06F 11/0745 | 714/746 |
| 2008/0034141 A1 * | 2/2008 | Furuzono | G06F 13/161 | 710/244 |

* cited by examiner

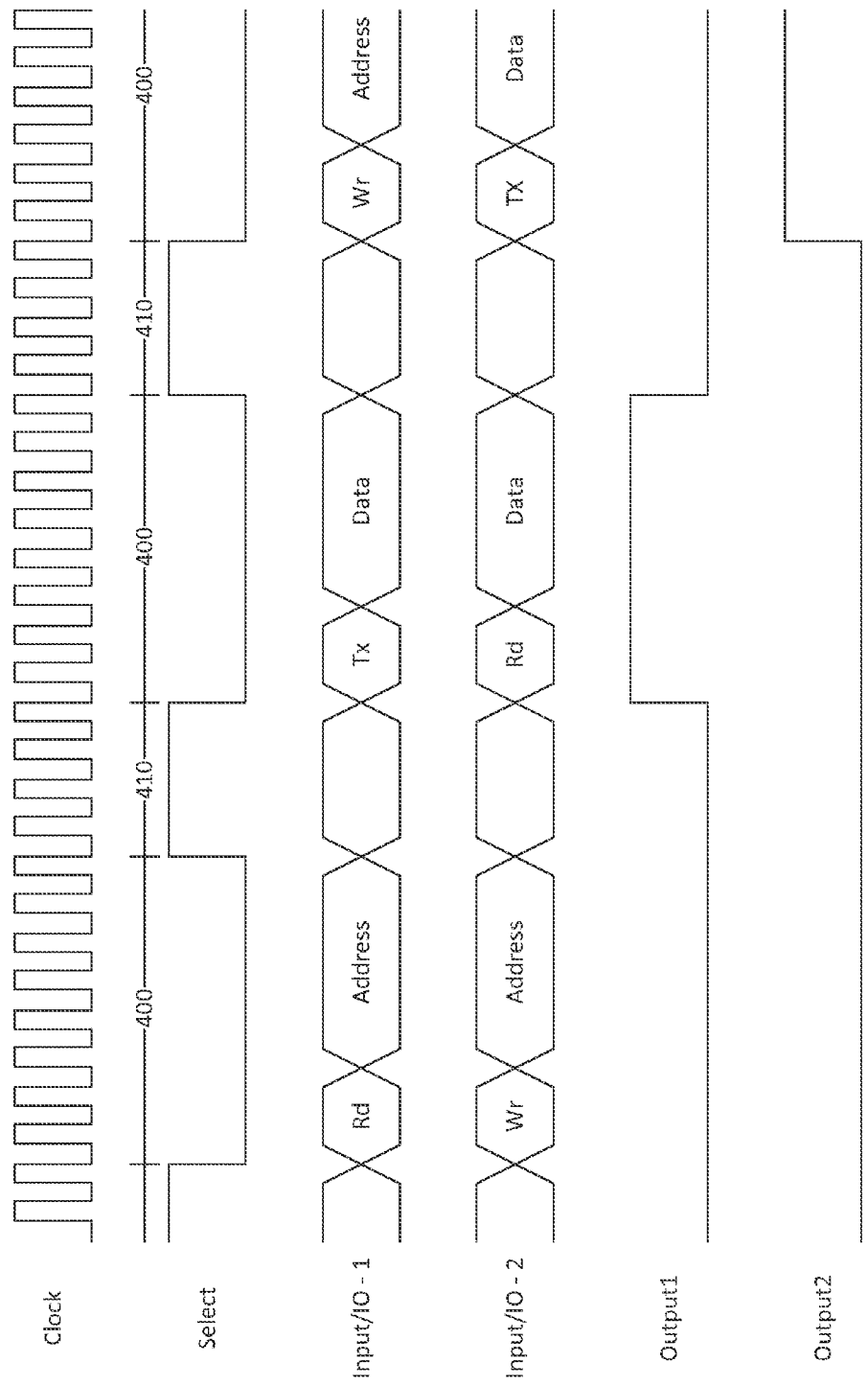

DEVICES WITH ARBITRATED INTERFACE BUSSES, AND METHODS OF THEIR OPERATION

TECHNICAL FIELD

The following relates to electrical devices, and more particularly to systems and devices having an arbitrated interface bus.

BACKGROUND

Redundancy is an important aspect of safety systems. Generally systems with more redundancy are considered safer, unless the redundant systems are adding too much delay into the system. Accordingly, systems and methods for adding redundancy to a system while minimizing any delay or latency are desired.

DESCRIPTION OF THE DRAWING FIGURES

Exemplary embodiments will hereinafter be described in conjunction with the following drawing figures, wherein like numerals denote like elements.

FIG. 4 illustrates exemplary clock signals in accordance with an embodiment.

DETAILED DESCRIPTION

Vehicles, such as automobiles or aircraft, and other commercial or industrial systems may be judged based upon how much redundancy is built into their respective safety systems. Automobiles, for example, may be judged based upon Automotive Safety Integrity Levels (ASIL). Vehicles having safety systems with higher levels of redundancy may be judged as having a higher ASIL level. However, many redundant safety systems introduce latency into a system. According to various exemplary embodiments, a device having an arbitrated interface bus is provided, which allows a safety system to introduce redundancy while minimizing latency in the system. As discussed in further detail below, the arbitrated interface bus allows multiple controllers substantially simultaneous access to data in a device, such as a sensor.

Figure 1:
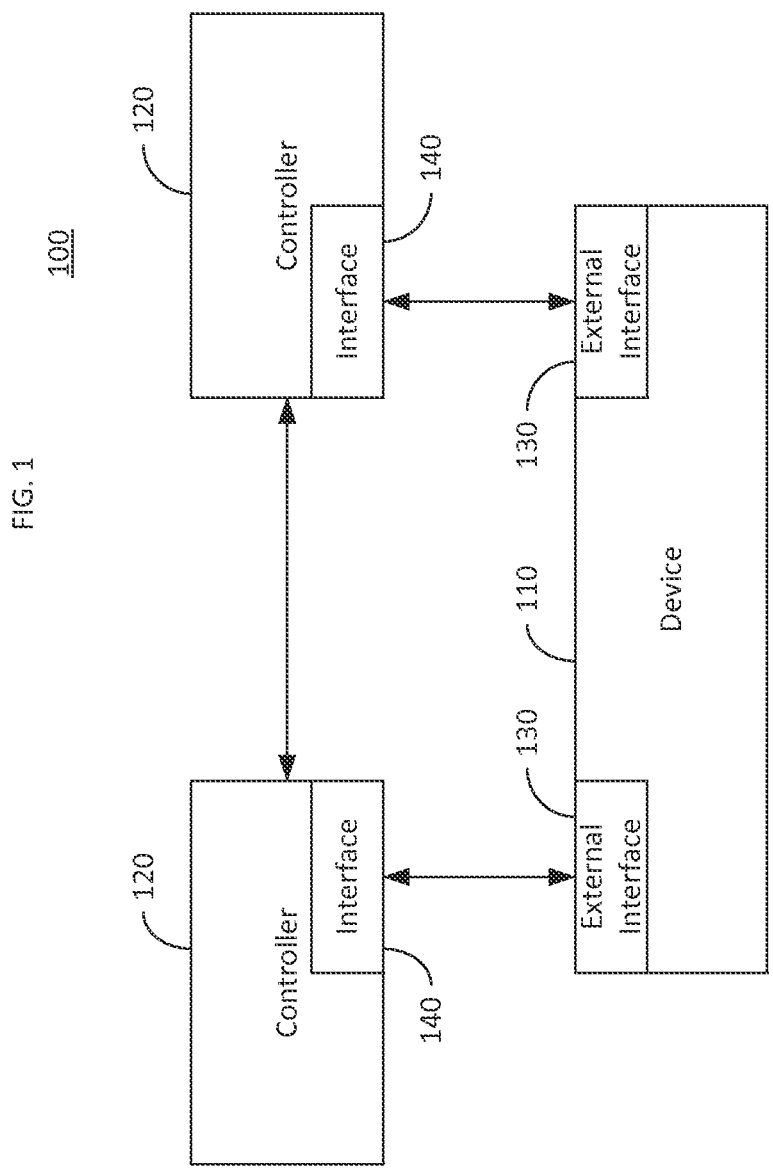
FIG. 1 is a block diagram of a system utilizing a device having an arbitrated interface bus, in accordance with an embodiment.

FIG. 1 is a block diagram of a system 100 utilizing a device 110 having an arbitrated interface bus, in accordance with an embodiment. The system 100 may be a vehicle, such as an automobile, aircraft, spacecraft, or watercraft, or any other residential, commercial or industrial system. The system 100 includes at least two controllers 120. Each controller 120 may include one or more processors, such as a central processing unit (CPU), a graphical processing unit (GPU), a physics processing unit (PPU), an application specific integrated controller (ASIC), a field programmable gate array (FPGA), a micro controller, or any other logic device or combination thereof. The controllers 120 may, for example, be responsible for controlling a safety system, such as an airbag or stability control system.

In one embodiment, for example, the device 110 may include one or more sensors and associated processors, data storage, and interfaces. Vehicles, for example, utilize a variety of sensors during their operation. For example, gyroscope sensors may be used in dynamic stability control systems. Other sensors, such as cameras, radar, lidar, impact sensors, brake pressure sensors, seat occupancy/position sensors, accelerometers, magnetic field sensors (magnetometers), pressure sensors, chemical sensors, temperature sensors or the like may be used to control airbags or other safety systems of a vehicle.

Each device 110 includes at least two external interfaces 130. In one embodiment, for example, one or more of the external interfaces 130 may utilize a serial peripheral interface (SPI) bus. In other embodiments, for example, one or more of the external interfaces may utilize an Inter-Integrated Circuit (IIC) interface, a Distributed Systems Interface (DSI3), a Peripheral Sensors Interface 5 (PSIS), and/or any other standardized or proprietary communications interface. Each external interface 130 is configured to connect to an interface 140 of a controller 120. As discussed in further detail below, each external interface 130 of the device 110 may independently and simultaneously receive a data access request from one of the controllers 120. Likewise, the external interfaces 130 can simultaneously transmit data to the respective controllers 120. In some instances the controllers 120 may request identical data (e.g., data stored within one particular register). Accordingly, by allowing both controllers 120 to simultaneously send data access requests and simultaneously receive data from the device 110, the controllers 120 can independently verify the data, adding a redundancy check, and respond to the data with minimal delay. If the controllers 120 are airbag deployment controllers, for example, one controller 120 may be assigned to arm the airbag and the other controller 120 may be assigned to deploy the airbag. Accordingly, by allowing multiple controllers 120 to access the same data simultaneously, sensitive features, such as airbag deployment, can be actuated when multiple separate controllers receive the data, and verify that the data has a value that is consistent with deploying the airbag. Further, as each controller can receive and process the data simultaneously the latency for deploying the airbag may be minimized.

While FIG. 1 illustrates a bi-direction communication line between each device 110 and each controller 120, one of ordinary skill would recognize that the devices 110 and controllers 120 could also be communicatively connected via two uni-directional communication lines (i.e., an input line and an output line), or any combination of bi-directional and uni-directional connections.

Figure 2:
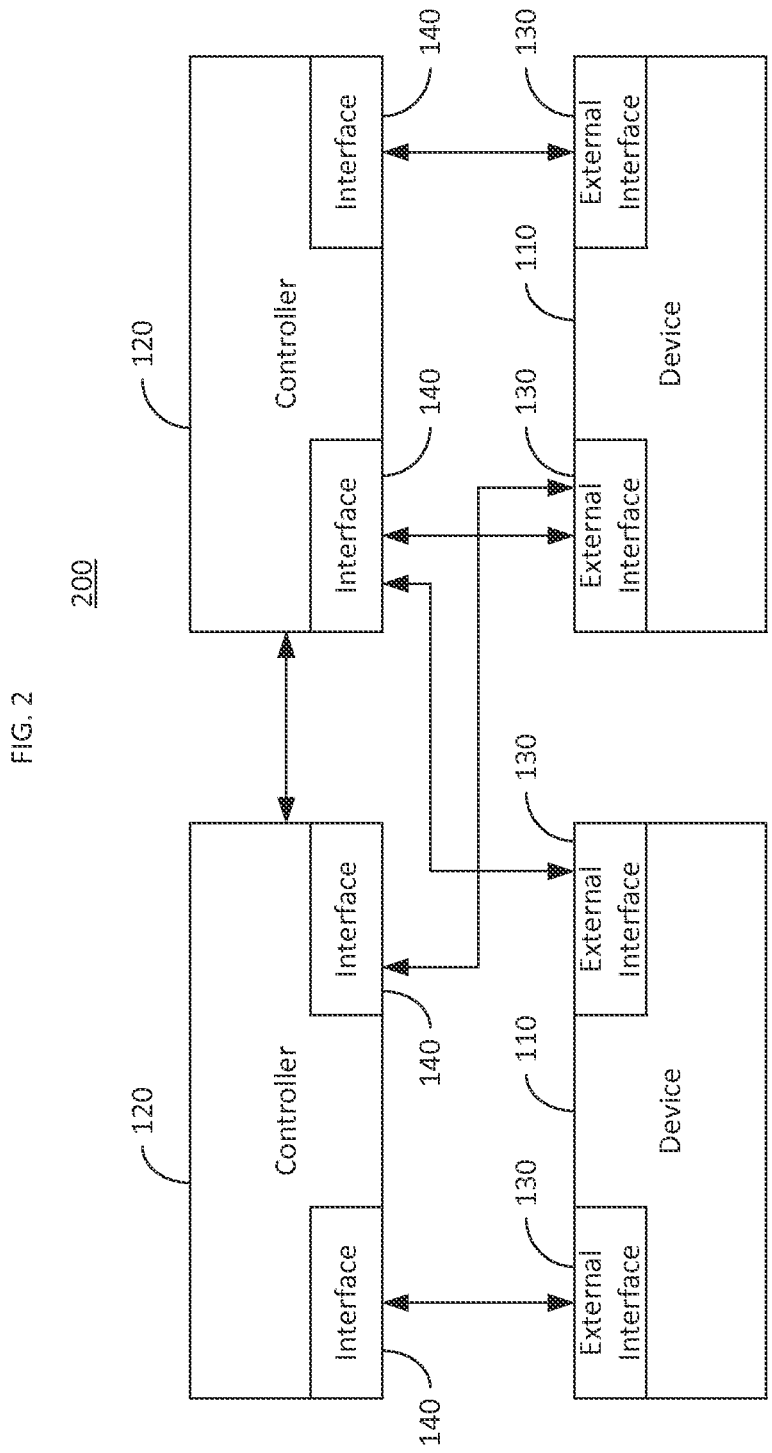
FIG. 2 is a block diagram of a system utilizing multiple devices, each having an arbitrated interface bus, in accordance with an embodiment.

FIG. 2 is a block diagram of a system 200 utilizing multiple devices 110, each having an arbitrated interface bus, in accordance with an embodiment. The system 200 illustrated in FIG. 2 includes two devices 110 having an arbitrated interface bus and two controllers 120. Each controller 120 includes at least two interfaces 140, and each device 110 includes at least two interfaces 130. Each controller 120 is communicatively coupled to both devices 110 via their respective interfaces 130 and 140. For example, as illustrated, one of the interfaces 140 of each controller 120 may be communicatively coupled with one of the interfaces 130 of each device 110. As discussed in further detail below, each controller 120 can simultaneously send data access requests to each device 110 and simultaneously receive responses from the requests (e.g., data) from each device 110. In one embodiment, for example, the devices 110 may be either identical or have a similar purpose, although they may be different, as well. For example, the devices 110 may both be crash sensors for a vehicle. Furthermore, the controllers 120 may be communicatively coupled to each other. Accordingly, the controllers 120 can each independently collect data from each device 110 and then cross-check the data with each other, adding another layer of redundancy while maintaining minimal latency.

Figure 3:
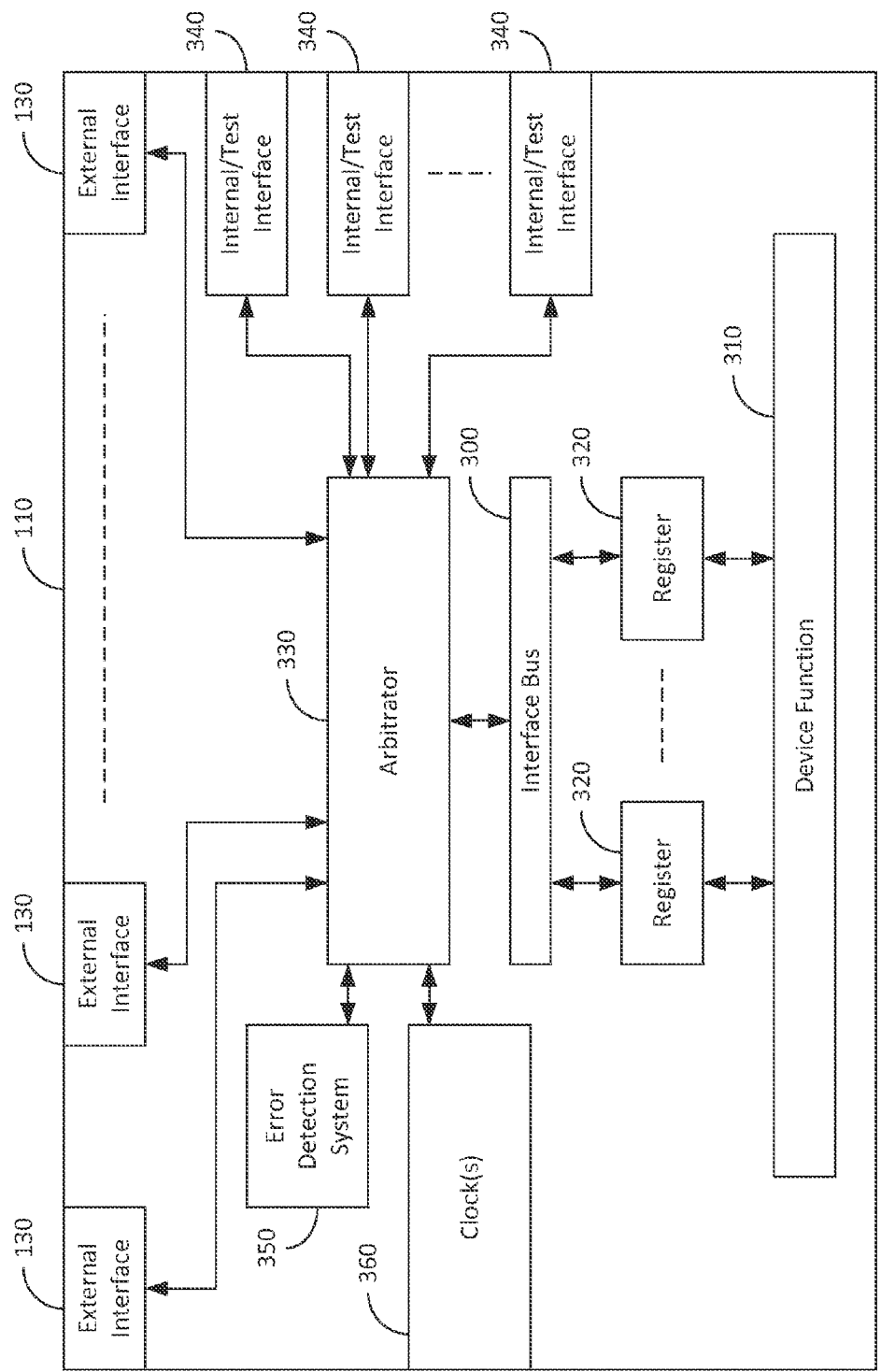
FIG. 3 is a block diagram of a device having an arbitrated interface bus, in accordance with an embodiment.

FIG. 3 is a block diagram of a device 110 having an arbitrated interface bus 300, in accordance with an embodiment. Each device 110 has one or more device functions 310 (e.g., sensors or other functions) which stores functional data into one or more registers 320. As used herein, the term "register" means any addressable data storage in which data may be stored, including a data register, random access memory (RAM), flash memory, and so on. The functional data will vary depending upon the purpose of the device 110. If the device 110 includes one or more gyroscopes, for example, the device 110 may store, in registers 320, relative positional coordinates which a vehicle or other system may use for determining an orientation of the device 110. Similarly, if the device 110 includes one or more accelerometers, magnetometers, and/or pressure sensors, the functional data may include accelerometer, magnetometer, and/or pressure sensor readings. If the device 110 includes an impact sensor, the functional data may correspond to a vehicle crash status. Registers 320 also may be used to store other types of data, as well. For example, when the device 110 includes one or more sensors (e.g., gyroscopes, accelerometers, magnetometers, pressure sensors, and so on), the registers 320 may be used to store trim data that is particular for the device 110, and which may be used by the device 110 to adjust raw sensor data measurements.

As discussed above, the device 110 includes two or more external interfaces 130. Each external interface 130 is communicatively coupled to the arbitrated interface bus 300 through an arbitrator 330. The arbitrator 330 controls which external interface 130 or other bus communicator has control of the arbitrated interface bus 300. In other words, the arbitrator 330 has control over the time at which an external interface 130 or other internal or external interface has access to the interface bus 300 to perform a function, such as a read request to a data register 320, a write request to a data register 320, or any other bus command. For example, other internal or test interfaces 340 or an error detection system 350 such as a cyclic redundancy checker (CRC) may also be coupled to the arbitrated interface bus 300 through the arbitrator 330. A CRC checker may, for example, periodically or occasionally perform CRC checks on trim data stored in registers 320 to ensure that the trim data is correct. The device 110 may include other modules for checking the system while in operation, and/or for automatic testing/trimming at factory test.

Each of the external interfaces 130, the other internal or test interfaces 340, error detection system 350, and other modules, referred to collectively as "possible bus masters," may send all required system bus signals along with a bus request signal. The system bus signals remain until the arbitrator 330 grants the bus to the possible bus master (at which time it becomes the "current bus master"). Once the grant is recognized, the current bus master keeps its request asserted until its requested operation is completed. After the current bus master completes its operation, its request is negated.

The arbitrator 330 may be a priority arbitrator, a round robin arbitrator, a fairness-type arbitrator, a scheduler-type arbitrator, or any combination thereof. According to an embodiment, the arbitrator 330 sets the priority for all the possible bus masters. This priority may be enforced when multiple possible bus masters request the system bus at the same time (e.g., in the same system clock cycle). Otherwise, possible bus masters may be granted the system bus on a first-come first-served basis.

Once the arbitrator 330 grants the system bus to a possible bus master (thus becoming the current bus master), the current bus master may be allowed to control the bus for however long it needs it. That is, as long as the current bus master's request is asserted, it may control the system bus. However, limits may be established, which specify a maximum time that a current bus master's request may remain asserted.

In one embodiment, for example, the arbitrator 330 may include a multiplexer and a controller. Accordingly, the arbitrator 330 may selectively couple one of the external interfaces 130, one of the internal or test interfaces 340 or the error detection system 350 to the interface bus 300. The interface bus 300 could be implemented as a multiplexed bus, a three-state bus, or any other bus or combination thereof. If the interface bus 300 is a multiplexed bus, for example, the multiplexer may be part of the interface bus 300 rather than the arbitrator 330.

An internal interface 340, for example, may be associated with control circuitry. The control circuitry, for example, may produce data which is used by other internal circuits or may be read through the external interfaces 130.

The test interface 340 may be used to test the device 110 while the device 110 is operating. A tester, such as another controller 120 in the system or a separate tester (not illustrated), may couple to a test interface 340 of the device 110. The tester may request the same data as the other controllers 120 in a safety system to monitor the data coming from the device 110. As discussed in further detail below, the test interface 340 may be assigned a lower priority than the external interfaces 130. As such, the tester can monitor the data coming from the device 110 without adding any delay into the system.

An error detection system 350 may also be coupled to the arbitrated interface bus 300 and arbitrator 330. In one embodiment, for example, the error detection system 350 may be a cyclic redundancy check system. One or more of the registers 320, for example, may have one or more data blocks indicative of an error status. The error detection system 350 can thus make requests to the arbitrator 330 for access to the data blocks to verify the error status of the device 110. As discussed in further detail below, the priority level of the error detection system 350 may be set such that the error detection system 350 may operate while introducing minimal delay into the primary function of the system (i.e., the controllers 120 retrieving data from the devices 110). Various mechanisms to monitor data values stored in registers 320 may be used. Such values may be static, or tested, for example, to ensure they remain within defined limits, or change at acceptable rates.

In one embodiment, for example, the arbitrator 330 may assign bus priority based upon a ranking. In this embodiment, for example, each type of internal component (i.e., the external interfaces 130, the internal or test interfaces 340 or error detection system 350) may be assigned a rank. The external interfaces 130, for example, may be assigned the highest priority such that any controller 120 coupled to the device 110 can retrieve the data with minimal latency. Furthermore, each external interface 130 may be assigned a different priority from the other external interfaces 130. If, for example, multiple controllers 120 are coupled to the device which are designed to retrieve the identical data, the external interface 130 coupled to the controller designated as the primary controller (rather than a backup controller) may be assigned a higher priority.

A system clock 360 may be provided in the device 110 or may be supplied to the device 110 from an external source. As discussed in further detail below, the data transfer between the device 110 and a controller 120 may be based in part upon the clock 360.

FIG. 4 illustrates exemplary signals for operating a device (e.g., device 110) in accordance with an embodiment. A clock signal Clock may be an operational clock signal for the device 110 and may be provided by the system clock 360 or an external source. The clock signal Clock, for example, may be used by the device to control read and write requests to the registers 320. A select signal Select may be a signal which controls the communication interface between the device 110 and the controllers 120. The select signal Select may have a first select interval 400 (which may be referred to as a "communication interval") during which the controller(s) 120 can communicate with the device 110 (e.g., send a data access request, receive data, or send data) through the interfaces 130 and a second select interval 410 during which the device 110 processes request(s) from the controller(s) 120. According to an embodiment, a data access request may be a read request or a write request. A read request essentially is a request from a controller 120 to read data (e.g., sensor measurement data) from a register 320, and a write request is a request from a controller 120 to write data (e.g., sensor trim data) to a register 320. Each data access request includes a first field indicating the type of request (i.e., read (Rd) or write (Wr)) and a second field that indicates an address of the register 320 within the device 110 that should be accessed (i.e., read from or written to). As seen in FIG. 4, during the leftmost communication interval 400, the device 110 can simultaneously receive, via its multiple interfaces 130, any combination of read (Rd) and write (WR) requests from multiple controllers 120 via the Input/IO-1 and Input/IO-2 signals. As mentioned above, the communication lines may be uni-directional (in which there are separate input and output lines) or a single bi-directional (i.e., a single line handling both input and output (10)). As mentioned above, each read request includes an address field, which indicates the address of the register 320 within device 110 that each controller 120 would like to read. Likewise, each write request includes an address field which indicates that address of the register 320 within device 110 that each controller 120 would like to write to.

The select signal Select also may have a second select interval 410 (which may be referred to as a "request processing interval"), during which the device 110 processes the requests according to the arbitrator 330. In other words, the arbitrator 330 allows each respective external interface 130 a turn at accessing the arbitrated interface bus 300 (and thus the register 320 corresponding to the address in the read or write access request) during the request processing interval 410. The accessed data requested in a read request is retained in the device 110 until an opportunity to transmit the data to the requesting controller 120 occurs (e.g., during the middle communication interval 400, as described below). The length of the request processing interval 410 can be selected to ensure that the each external interface 130 will have enough time to access the interface bus 300 such that any requested data through a read (Rd) request will be available to be transmitted to the respective controller 120 during the communication interval 400 subsequent to the request processing interval 410 in which the request was processed.

The arbitrator 330 can schedule for the internal interface 340 or error correction interface 350 to have access to the arbitrated interface bus 300 during the select interval 400 when no external interface 130 requests are being processed. Additionally, the arbitrator 330 can schedule for an internal interface 340 or error correction interface 350 to have access to the arbitrated interface bus 300 during a request processing interval 410 if one of the internal interface 340 or error correction interface 350 has a higher priority than any of the external interfaces 130 or there is time left in the request processing interval 410 after processing for the external interfaces 130 have completed. Accordingly, the error detection system 350 (i.e., another redundancy check level) and the internal interface/testing interface 340 can be added to a device without adding any delay into the primary function of the system.

In FIG. 4, during the middle communication interval 400, the data accessed during the previous request processing interval 410 (i.e., the data accessed from the registers 320 during the previous processing interval 410) may be transmitted on the corresponding output line Output 1 when the system is utilizing uni-directional communication lines or transmit (Tx) on the corresponding IO line if the system is utilizing bi-directional communication lines. More particularly, the device 110 transmits or sends the requested data to the corresponding requesting controller 120 via the external interface 130 corresponding to each requesting controller 120.

As discussed above, the communication lines between the device 110 and controller 120 may be uni-directional lines or bi-direction lines. In addition, the communication lines and their associated interfaces may be parallel or serial. If the communication lines are bi-directional, the response to the data request may be transmitted over a subsequent select interval 400 along the respective input (in this case IO) lines. Alternatively, or in combination therewith, there can be multiple uni-directional communication lines, as also illustrated in FIG. 4. In embodiments with uni-directional communication lines, the response to data requests may be transmitted over the respective output line (Output 1 or Output 2) during the select interval 400.

In one embodiment, for example, a device is provided. The device may include, but is not limited to one or more registers configured to store data, a plurality of external interfaces configured to receive requests for data stored in the register(s), an arbitrator communicatively coupled to each of the plurality of external interfaces, and an interface bus communicatively coupled between the arbitrator and the register(s), wherein the arbitrator is configured to arbitrate control of the interface bus between the plurality of external interfaces. In one embodiment, for example, the arbitrator is configured to arbitrate control of the interface bus between the plurality of external interfaces based upon a priority assigned to each of the plurality of external interfaces, where the external interface with the highest priority would receive access to the interface bus first. In one embodiment, for example, the arbitrator is configured to arbitrate control of the interface bus between the plurality of external interfaces based upon a priority level received with each respective data request. In one embodiment, for example, the device may further include an error detection system communicatively coupled to the arbitrator, wherein the arbitrator is configured to arbitrate control of the interface bus to the error detection system based upon a priority assigned to the error detection system. In one embodiment, for example, the device is configured to receive a select signal having a first interval and a second interval, the plurality of external interfaces are configured to receive respective requests for data during the first interval, and the arbitrator is configured to arbitrate control of the interface bus to the plurality of external interfaces during the second interval, wherein a length of the first interval is fixed and a length of the second interval is variable based upon a number of external interfaces simultaneously accessing the device. In one embodiment, for example, the arbitrator is configured to arbitrate control of the interface bus to the error detection system during the first interval. In one embodiment, for example, the device may further include a test interface communicatively coupled to the arbitrator, wherein the arbitrator is configured to arbitrate control of the interface bus to the test interface based upon a priority assigned to the test interface. In one embodiment, for example, the plurality of external interfaces are each configured to receive requests for data from the register(s) from a unique external master controller.

In another embodiment, for example a method for controlling access to an interface bus in a device is provided. The method may include, but is not limited to, receiving, by an arbitrator, requests to access one or more registers through the interface bus from one or more of a first external interface, a second external interface, an error detection system, and a test interface, and arbitrating, by the arbitrator, access to the interface bus based upon a priority associated with the first external interface, the second external interface, the error detection system, and the test interface. In one embodiment, for example, the method may further include receiving, by the arbitrator, a select signal having a first interval and a second interval. In one embodiment, for example, the method may further include arbitrating, by the arbitrator, control of the interface bus to the error detection system and the test interface during the first interval, and arbitrating, by the arbitrator, control of the interface bus to the first external interface and the second external interface during the second interval when the arbitrator receives a request to access the one or more registers through the interface bus from the first external interface or the second external interface during the first interval. In one embodiment, for example, the method may further include receiving, by the first external interface, a first data access request from a first external controller, and receiving, by the second external interface, a second data access request from a second external controller, wherein the first external controller is different than the second external controller and the first data access request and the second data access request are received substantially simultaneously. In one embodiment, for example, the method may further include sending, by the first external interface, first data in response to the first data access request to the first external controller, and sending, by the second external interface, second data in response to the second data access request to the second external controller, wherein the first data and the second data are sent substantially simultaneously, wherein the first data access request and the second data access request are receiving during a first interval of a clock signal and the first data sent in response to the first data request and the second data sent in response to the second data request are sent during a second interval of the clock signal.

In another embodiment, for example, a redundant safety system is provided. The redundant safety system may include, but is not limited to, a first controller configured to enable a safety device, a second controller configured to activate the safety device, and a sensor communicatively coupled to the first controller and the second controller. The sensor may include one or more registers configured to store sensor data, a first external interface configured to receive requests for sensor data from the first controller, a second external interface configured to receive requests for sensor data from the second controller, an arbitrator communicatively coupled to the first external interface and the second external interface, and an interface bus communicatively coupled between the arbitrator and the one or more registers, wherein the arbitrator is configured to arbitrate control of the interface bus between the first external interface and the second external interface. In one embodiment, for example, the arbitrator is configured to arbitrate control of the interface bus between the first external interface and the second external interface based upon a priority assigned to each of the first external interface and the second external interface. In one embodiment, for example, the sensor may further include an error detection system communicatively coupled to the arbitrator, wherein the arbitrator is configured to arbitrate control of the interface bus to the error detection system based upon a priority assigned to the error detection system. In one embodiment, for example, the sensor is configured to receive a first select signal having a first interval and a second interval, wherein the first external interface and the second external interface are configured to receive respective requests for sensor data during the first select interval, and the arbitrator is configured to arbitrate control of the interface bus to the first external interface and the second external interface during the second select interval. In one embodiment, for example, a length of the first interval is fixed and a length of the second interval is variable based upon a number of external interfaces simultaneously accessing the sensor.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the embodiments in any way. To the contrary, various changes may be made in the function and arrangement of the various features described herein without departing from the scope of the claims and their legal equivalents.

What is claimed is:

1. A device, comprising:
   data storage including one or more registers configured to store data;
   a plurality of external interfaces, each of the plurality of external interfaces configured to receive substantially simultaneously during a first communication interval a data access request for access to the one or more registers, the data access requests comprising one of a read request to the one or more registers and a write request to the one or more registers;
   an arbitrator communicatively coupled to each of the plurality of external interfaces; and
   an interface bus communicatively coupled between the arbitrator and the one or more registers,
   wherein the arbitrator is configured to arbitrate control of the interface bus between the plurality of external interfaces during a first single processing interval subsequent to the first communication interval to complete each write request and retrieve data for each read request during the first single processing interval, and
   wherein the plurality of external interfaces are configured to substantially simultaneously transmit the retrieved data for each read request during a second communication interval subsequent to the first single processing interval.

2. The device according to claim 1, wherein the arbitrator is configured to arbitrate control of the interface bus between the plurality of external interfaces based upon a priority assigned to each of the plurality of external interfaces.

3. The device according to claim 1, wherein the arbitrator is configured to arbitrate control of the interface bus between the plurality of external interfaces based upon a priority level received with each respective data access request.

4. The device according to claim 1, further comprising:
an error detection system communicatively coupled to the arbitrator,
wherein the arbitrator is configured to arbitrate control of the interface bus to the error detection system based upon a priority assigned to the error detection system.

5. The device according to claim 1, wherein a length of each communication interval is fixed and a length of the each single processing interval is variable based upon a number of external interfaces simultaneously accessing the device.

6. The device according to claim 1, further comprising an error detection system communicatively coupled to the arbitrator, wherein the arbitrator is configured to arbitrate control of the interface bus to the error detection system during the communication interval.

7. The device according to claim 1, further comprising a test interface communicatively coupled to the arbitrator, wherein the arbitrator is configured to arbitrate control of the interface bus to the test interface based upon a priority assigned to the test interface.

8. The device according to claim 1, wherein the plurality of external interfaces are each configured to receive data access requests from a different external controller.

9. A method for controlling access to an interface bus in a device, comprising:
receiving, by an arbitrator, multiple data access requests to access one or more registers through the interface bus from multiple components selected from a first external interface, a second external interface, an error detection system, and a test interface, the first external interface and the second external interface configured to receive data access requests substantially simultaneously during a first communication interval, the data access requests comprising one of a read request to the one or more registers and a write request to the one or more registers;
arbitrating, by the arbitrator, access to the interface bus based upon priorities associated with each of the multiple components, wherein during a first single processing interval subsequent to the first communication interval the arbitrator arbitrates control to the interface bus to complete each write request from the first external interface and the second external interface and retrieves data for each read request from the first external interface and the second external interface, and
transmitting, substantially simultaneously by the first external interface and the second external interface, the retrieved data for each read request received by the first external interface and the second external interface during a second communication interval subsequent to the first single processing interval.

10. The method according to claim 9, further comprising receiving, by the arbitrator, a select signal having a first interval and a second interval.

11. The method according to claim 10, further comprising:
arbitrating, by the arbitrator, control of the interface bus to the error detection system and the test interface during the first communication interval; and
arbitrating, by the arbitrator, control of the interface bus to the first external interface and the second external interface during the first single processing interval when the arbitrator receives a data access request from the first external interface or the second external interface during the first interval.

12. The method according to claim 9, further comprising:
receiving, by the first external interface, a first data access request from a first external controller; and
receiving, by the second external interface, a second data access request from a second external controller,
wherein the first external controller is different than the second external controller.

13. The method according to claim 12, further comprising:
sending, by the first external interface, first data in response to the first data access request to the first external controller; and
sending, by the second external interface, second data in response to the second data request to the second external controller.

14. A redundant safety system, comprising:
a first controller configured to enable a safety device;
a second controller configured to activate the safety device; and
a sensor communicatively coupled to the first controller and the second controller, the sensor comprising:
data storage including one or more registers configured to store sensor data;
a first external interface configured to receive data access requests for sensor data from the first controller;
a second external interface configured to receive requests data access for sensor data from the second controller, the first external interface and the second external interface configured to receive data access requests substantially simultaneously during a first communication interval, the data access requests comprising one of a read request to the one or more registers and a write request to the one or more registers;
an arbitrator communicatively coupled to the first external interface and the second external interface; and
an interface bus communicatively coupled between the arbitrator and the one or more registers,
wherein the arbitrator is configured to arbitrate control of the interface bus between the first external interface and the second external interface during a first single processing interval subsequent to the first communication interval to complete each write request and retrieve data for each read request during the first single processing interval, and
wherein the first external interface and the second external interface are configured to substantially simultaneously transmit the retrieved data for each read request during a second communication interval subsequent to the first single processing interval.

15. The redundant safety system according to claim 14, wherein the arbitrator is configured to arbitrate control of the interface bus between the first external interface and the second external interface based upon a priority assigned to each of the first external interface and the second external interface.

16. The redundant safety system according to claim 14, wherein the sensor further comprises:
an error detection system communicatively coupled to the arbitrator,
wherein the arbitrator is configured to arbitrate control of the interface bus to the error detection system based upon a priority assigned to the error detection system.

17. The redundant safety system according to claim 14, wherein a length of the each communication interval is fixed and a length of the each single processing interval is variable based upon a number of external interfaces simultaneously accessing the sensor.

* * * * *